Patented Dec. 17, 1940

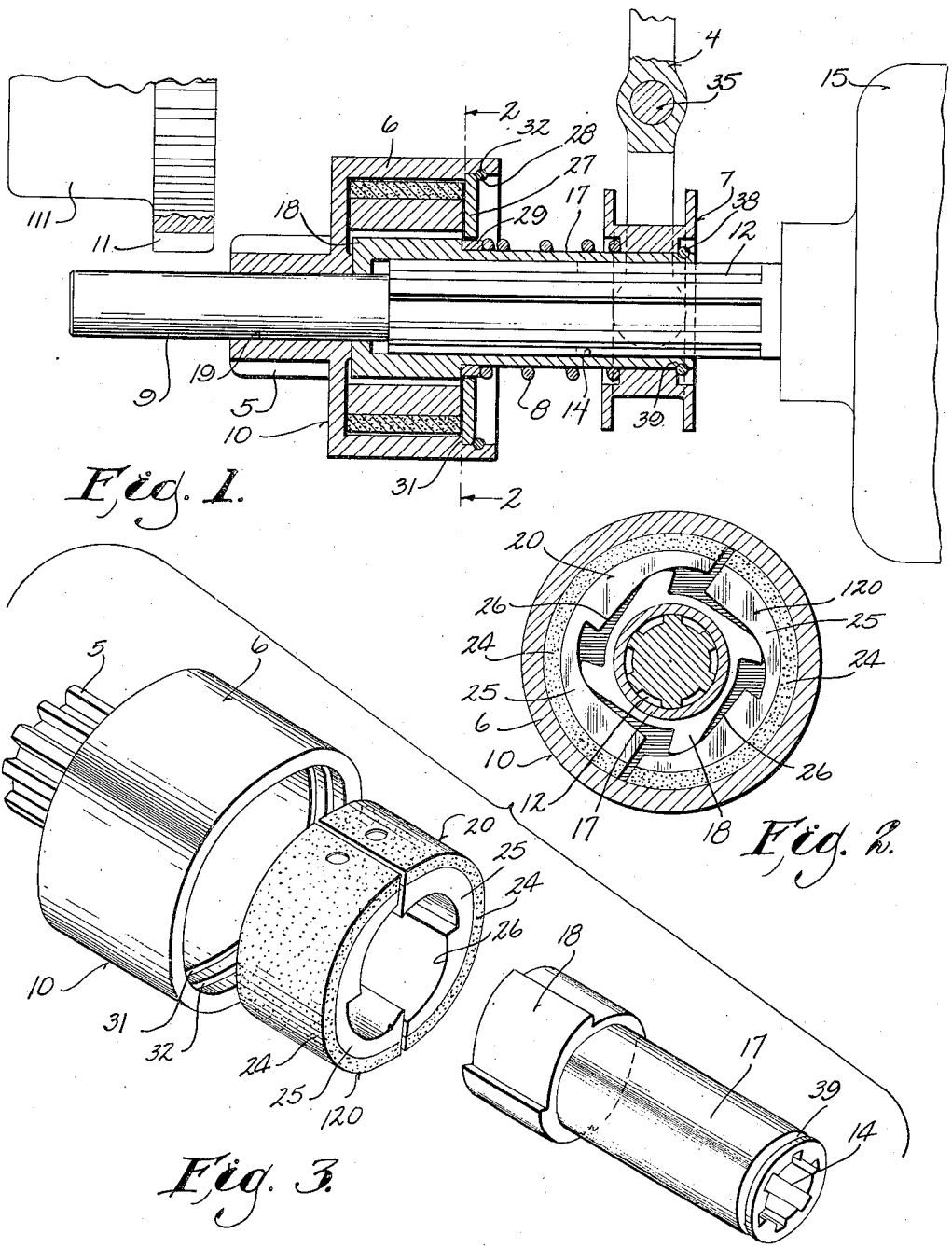

2,224,935

UNITED STATES PATENT OFFICE 2,224,935

STARTING MOTOR DRIVE

William F. Schultz, Ripon, Wis.

Application February 2, 1939, Serial No. 254,221

2 Claims. (Cl. 192—45.1)

My invention pertains to starting motor drives in general, and more specifically to that type of starting motor drive employing an over-running clutch.

The primary object of my invention is to provide an improved starting motor drive in which the clutch mechanism is incorporated in a unit with the driving pinion.

A further object of my invention is to provide in such a drive a novel and efficient clutch engagement mechanism of the cam operated type.

In the drawing:

Fig. 1 is a cross sectional view of the device, fragmentarily illustrating an electric starting motor and an engine fly wheel.

Fig. 2 is a cross sectional view of the clutch member, taken along line 2—2 of Fig. 1.

Fig. 3 is a perspective view of the novel clutch members, arranged in order of assembly.

Like parts are designated by the same reference characters throughout the several views.

My starter is of the type in which the starter pinion 5, Fig. 1, together with the clutch assembly 10, is shifted longitudinally of the armature shaft 9 of electric starting motor 15 by means of a collar 7, through the intervening pressure of a spring 8, to mesh the pinion 5 with the engine fly wheel gear 11, start motor 15, and rotate engine fly wheel 111.

The starting motor shaft, which may be an integral extension of the armature shaft, is provided with a splined section 12, Fig. 1, and a reduced bearing section 9. An elongated driving member including a bearing portion 17 and a cam rotor portion 18 is provided with a splined center bore 14. The driving member is slidably mounted to, and engaged with, the splined shaft section 12. Clutch assembly housing 10 is comprised of a drum portion 6, and an integral pinion gear 5, said gear portion being provided with a central bore 19 whereby it is slidably mounted on bearing section 9 of the motor shaft.

Disposed within drum portion 6 is rotor 18 and complementary said rotor are disposed associated shoes 20 and 120. Each said shoe is comprised of an inner metallic portion 25, having a cam follower surface as shown in contour by 26, Fig. 2, and an arcuately curved face to which is secured a band of brake lining or the like, 24, said lining engageable with the inner periphery of drum 6.

The end of cup-shaped element 6 is closed by washer 27 disposed in said end adjacent shoulders 31 and secured therein by means of annular expansion spring 28 disposed in annular groove 32. Thereby the pinion and cup are connected unitarily with the driving sleeve and cam for axial shifting movement, notwithstanding their freedom for relative rotation when the clutch is not engaged.

One end of expansion spring 8 is fixed to collar 29, said collar being secured by a pressed fit to shaft 17 adjacent cam rotor 18, the opposite end of said spring being fixed to collar 7. Contractile ring 38, disposed in annular groove 39 of shaft 17, restricts movement of collar 7 in a direction away from clutch assembly 10.

To engage the pinion with the motor gear, the operator pivots lever 4 about bearing 35 in a clockwise direction, as viewed in Fig. 1. This slides the entire pinion and clutch assembly along splined section 12 toward the flywheel. When pinion 5 is fully engaged with flywheel gear 11, the motor is started in the usual way by a switch, operatively connected to lever 4 (not shown). It turns counterclockwise as viewed in Fig. 2. The initial rotation of the starting motor throws the shoes 20 and 120 outwardly by centrifugal force until their lining 24 frictionally contacts the inner periphery of drum 6 which is stationary up to this point. The resistance of the drum arrests the motion of the shoes, which would otherwise turn freely within the drum, with resultant motion of the cam surfaces beneath the cam followers 26 and 126 to increase the frictional pressure between the respective members and gradually but firmly lock the drum to the driving cam whereby to transmit the full power of the starting motor to the engine fly wheel.

When the internal combustion engine starts, the fly wheel will turn the pinion 5 and drum 6 at a higher rate of rotation than these parts have been turned by the armature shaft, with resultant relative movement between drum 6 and cam rotor 18 in such a direction as to cause cam followers 20 and 120 to ride reversely over the cams to a position where their brake shoes are left free within the drum and would, but for the centrifugal force, be retracted therein. The release of the cam action with resultant lack of pressure of said shoes against the drum 6 permits said drum to turn freely and over-run driving cam 18 without damage to the starting motor pending release of the mechanism by the operator.

Should pinion 5 fail to mesh with fly wheel gear 11, axial motion of said pinion assembly is arrested by contact between the ends of said pinion and fly wheel gears respectively, and collar 7 will slide along shaft 17 toward pinion assembly 10, compressing spring 8. When spring 8 is substantially compressed, arm 4 will have reached the position in which the motor switch closes, and motor 15 will start with a resultant initial slow rotation of pinion 5 as shoes 20 and 120 start to frictionally engage drum 6, said rotation resulting in the movement of pinion 5 to a position for mesh with fly wheel gear 11, at which point the axial pressure exerted by spring 7 on clutch assembly 10 will snap pinion 5 into an engaged position with fly wheel gear 11.

When the internal combustion engine is started, the operator will release the starting lever 4, and collar 7 will move reversely and pull clutch assembly 10 back along the motor shaft, thereby disengaging pinion 5 from fly wheel gear 11, and at the same time opening the electric starting motor switch whereby said starting motor and drive will come to rest.

I claim:

1. In a clutch, a driven gear member having a housing provided with a cylindrical inner chamber, a driving member having a cam rotor provided with a plurality of peripherally spaced lobes and disposed within and concentric to said housing chamber, a plurality of cam shoes operably disposed within the chamber, each shoe comprising an arcuate portion adapted for frictional engagement with the chamber walls and a plurality of peripherally spaced arcuate cam follower portions in complementary operative engagement with a plurality of said cam rotor lobes, whereby during relative rotation of the driving and driven members in one direction each shoe is forced outwardly by equalized pressure applied by the complementary cam lobes to peripherally spaced portions of the cam follower to effect frictional engagement between the arcuate shoe portions and the inner wall of the chamber, each shoe being held against tilting by the plurality of peripherally spaced cam lobes engaged therewith.

2. A clutch including a driving element comprising in combination a cam rotor section provided with at least four lobes spaced circumferentially thereof and an integral bearing section, a gear element, an integral drum within which said cam rotor section is disposed, means retaining said cam rotor within the drum, and a plurality of engagement shoes disposed about said cam rotor in said drum, each shoe being provided with plural cam follower surfaces for complementary engagement by the cam rotor lobes, and said cam having a plurality of lobes engaged with each shoe at peripherally spaced points whereby during rotation of the driving element rotor in one direction said shoes are forced outwardly to frictionally engage the inner wall of said drum at substantially equalized pressure.

WILLIAM F. SCHULTZ.